United States Patent
Hogan et al.

(10) Patent No.: US 6,255,404 B1
(45) Date of Patent: *Jul. 3, 2001

(54) METHOD TO CONTROL INCREASE IN VISCOSITY DURING AGING OF SILOXANE MODIFIED POLYMERS

(75) Inventors: Terrence E. Hogan, Cuyahoga Falls; Chen-Chy Lin, Hudson; William L. Hergenrother, Akron, all of OH (US)

(73) Assignee: Bridgestone Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/360,551

(22) Filed: Jul. 26, 1999

(51) Int. Cl.$^7$ .................................................. C08F 8/00
(52) U.S. Cl. ......................................... 525/326.5; 525/342
(58) Field of Search ................................. 525/326.5, 342

(56) References Cited

U.S. PATENT DOCUMENTS

| | | | |
|---|---|---|---|
| 4,191,713 | * 3/1980 | Yonezawa et al. | 525/326.5 |
| 4,412,042 | * 10/1983 | Matsuura et al. | 525/326.5 |
| 5,659,056 | 8/1997 | Hergenrother et al. | 556/401 |
| 5,811,479 | 9/1998 | Labauze | 524/188 |
| 5,969,057 | 10/1999 | Schoeley et al. | 525/474 |
| 6,008,295 | 12/1999 | Takeichi et al. | 525/105 |

FOREIGN PATENT DOCUMENTS

| | | | |
|---|---|---|---|
| 0447066A1 | 2/1991 | (EP) | C08L/9/00 |
| 0801078A1 | 10/1997 | (EP) | C08C/52/04 |
| 0864605A2 | 9/1998 | (EP) | C08K/5/54 |
| 0890580A1 | 1/1999 | (EP) | C08C/19/44 |

* cited by examiner

*Primary Examiner*—Bernard Lipman
(74) *Attorney, Agent, or Firm*—John H. Hornickel; Rodney L. Skoglund

(57) ABSTRACT

A method for controlling any increase in Mooney viscosity during aging of siloxane-functionalized polymers includes the step of adding a viscosity stabilizing effective amount of a viscosity stabilizing agent selected from the group consisting of alkyl alkoxysilanes of the structural formula $$R^1{}_n Si(OR^2)_{4-n}$$

wherein $R^1$ is selected from the group consisting of $C_1$ to $C_{20}$ alkyl, $C_4$ to $C_{10}$ cycloalkyl, or $C_5$ to $C_{20}$ aromatic groups, wherein $R^2$ may be the same as or different from $R^1$ and is selected from the group consisting of $C_1$ to $C_{20}$ alkyl, $C_4$ to $C_{10}$ cycloalkyl, or $C_5$ to $C_{20}$ aromatic groups, and wherein n is an integer from 1 to 3. The method provides for the stabilization of Mooney viscosity of siloxane-functionalized polymers at any given level upon aging. The viscosity stabilizing agents react with the siloxane-functionalized polymers during hydrolysis of the siloxane end groups to form moisture stabilized polymers.

12 Claims, No Drawings

METHOD TO CONTROL INCREASE IN VISCOSITY DURING AGING OF SILOXANE MODIFIED POLYMERS

TECHNICAL FIELD

This invention relates to a method for controlling the increase in Mooney viscosity during aging of siloxane-functionalized polymers. More particularly, the invention relates to a method to equilibrate and stabilize the Mooney viscosity at any given level upon aging of these siloxane-modified polymers by the addition of alkyl alkoxysilanes such as low molecular weight alkyl trialkoxysilanes which react with the siloxane-functionalized polymers during hydrolysis of the siloxane end groups to form moisture stabilized polymers.

BACKGROUND OF THE INVENTION

It is common for elastomeric polymers such as styrene-butadiene rubbers having a styrene content of from about 20 percent to about 35 percent to be produced in organic solvents such as hexane. These polymers can be terminated using a number of different compounds including silane containing compounds to yield silane end-capped polymers. This siloxane termination may also result in an increase in the Mooney viscosity of the treated polymer similar to the increase that occurs during tin coupling. However, upon subsequent desolventization of the siloxane-terminated polymer through the use of either steam or heated water, an even larger increase in Mooney viscosity often occurs during the hydrolysis of siloxane groups such as pendant —SiOR groups on the siloxane end groups thereby leading to coupling of the polymer via formation of Si—O—Si bonds between two siloxane end groups.

Thus, heretofore, a process utilizing steam or heated water in the desolventization of siloxane end-capped polymers containing hydrolyzable groups such as pendant —SiOR groups has always been accompanied by an increase in the Mooney viscosity of the polymers due to hydrolysis and subsequent coupling that occurs between the terminal siloxane groups.

In an attempt to overcome this hydrolysis and coupling problem, U.S. Pat. No. 5,659,056 set forth to treat the polymer prior to desolventization with a viscosity stabilizing agent soluble in the solvent used to prepare the polymer. In particular, this viscosity stabilizing agent was an acid such as $C_1$ to $C_{12}$ aliphatic and $C_6$ to $C_{12}$ cycloaliphatic and aromatic carboxylic acids including acetic acid, propionic acid, butyric acid, decanoic acid, cyclohexanoic acid, benzoic acid and the like. This viscosity stabilizing agent was used in suitable amounts to stabilize the viscosity, generally in the range of from 0.8 to 1.2 mole equivalents of viscosity stabilizing agent per mole equivalent of anionic initiator.

Notably, the viscosity stabilizing agents set forth in U.S. Pat. No. 5,659,056 do not react with the siloxane terminal end groups of the polymer, but rather serve to neutralize the by-product lithium compounds in admixture with the polymer. It is in this manner that the stabilizing agents of U.S. Pat. No. 5,659,056 serve to stabilize the Mooney viscosity of a siloxane terminated polymer having at least one hydrolyzable substituent on the siloxane end group against substantial increases during contact with water. Moreover, it is acknowledged that an increase in Mooney viscosity can be slowed substantially using the method set forth in U.S. Pat. No. 5,659,056 not only during desolventization, but also during subsequent storage for a limited period of time where the polymer may be subjected to hydrolysis in the form of moisture in the air or in some other manner.

Unfortunately, however, it has been found that the process set forth in U.S. Pat. No. 5,659,056, does not actually prevent an increase in Mooney viscosity, but only slows substantially the rate of the hydrolysis reaction and, therefore, the rate of coupling of the polymer. Over a period of time, the slow hydrolysis of the siloxane end group will occur, thereby continuing the problem of increased Mooney viscosity and coupling of the siloxane terminated polymers.

Thus, while attempts have been successfully made heretofore to slow down the rate of the hydrolysis reaction which results in the coupling of the siloxane end groups of the polymers, the art has not provided a means or method by which to stabilize the polymer upon aging and essentially stop the coupling of the siloxane terminated polymers.

SUMMARY OF INVENTION

It is, therefore, an object of the present invention to provide a method for effectively controlling the increase in Mooney viscosity of a siloxane-functionalized polymer due to hydrolysis and coupling of the polymer.

It is another object of the present invention to provide a method for effectively stabilizing the Mooney viscosity of a siloxane-functionalized polymer at any desired level.

It is yet another object of the present invention to provide a method for effectively controlling and stabilizing the Mooney viscosity of a siloxane-functionalized polymer upon aging of the polymer.

It is still another object of the present invention to provide a method for maintaining a substantially consistent Mooney viscosity of a siloxane-functionalized polymer at a desired level even during conditions which would hydrolyze the siloxane-terminated polymer.

It is still a further object of the present invention to provide a moisture stabilized polymer.

At least one or more of the foregoing objects, together with the advantages thereof over the known art relating to the moisture stabilization of siloxane-functionalized polymers, which shall become apparent from the specification which follows, are accomplished by the invention as hereinafter described and claimed.

In general the present invention provides a method for stabilizing the Mooney viscosity of a siloxane-terminated polymer having at least one hydrolyzable substituent on the siloxane end group by adding, after the polymerization but still in the presence of an inert solvent, a viscosity stabilizing effective amount of a viscosity stabilizing agent selected from the group consisting of alkyl alkoxysilanes of the structural formula $$R^1{}_n Si(OR^2)_{4-n}$$

wherein $R^1$ is selected from the group consisting of $C_1$ to $C_{20}$ alkyl, $C_4$ to $C_{10}$ cycloalkyl, or $C_5$ to $C_{20}$ aromatic groups, wherein $R^2$ may be the same as or different from $R^1$ or other $R^2$, if any, and is selected from the group consisting of $C_1$ to $C_{20}$ alkyl, $C_4$ to $C_{10}$ cycloalkyl, or $C_5$ to $C_{20}$ aromatic groups, and wherein n is an integer from 1 to 3, prior to contacting the polymer with water.

The present invention also includes a moisture stabilized polymer comprising the hydrolysis reaction product of a siloxane terminated polymer reacted with an alkyl alkoxysilane having the structural formula:

$$R^1{}_n Si(OR^2)_{4-n}$$

wherein $R^1$ is selected from the group consisting of $C_1$ to $C_{20}$ alkyl, $C_4$ to $C_{10}$ cycloalkyl, or $C_5$ to $C_{20}$ aromatic groups, wherein $R^2$ may be the same as or different from $R^1$ and is selected from the group consisting of $C_1$ to $C_{20}$ alkyl, $C_4$ to $C_{10}$ cycloalkyl, or $C_5$ to $C_{20}$ aromatic groups, and wherein n is an integer from 1 to 3.

The present invention further includes a tire comprising an elastomeric compound containing the moisture stabilized polymer comprising the hydrolysis reaction product of a siloxane terminated polymer reacted with an alkyl alkoxysilane having the structural formula:

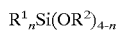

$$R^1{}_n Si(OR^2)_{4-n}$$

wherein $R^1$ is selected from the group consisting of $C_1$ to $C_{20}$ alkyl, $C_4$ to $C_{10}$ cycloalkyl, or $C_5$ to $C_{20}$ aromatic groups, wherein $R^2$ may be the same as or different from $R^1$ and is selected from the group consisting of $C_1$ to $C_{20}$ alkyl, $C_4$ to $C_{10}$ cycloalkyl, or $C_5$ to $C_{20}$ aromatic groups, and wherein n is an integer from 1 to 3.

PREFERRED EMBODIMENT FOR CARRYING OUT THE INVENTION

As noted hereinabove, the present invention is substantially directed toward a method for controlling, preferably stabilizing, and more preferably, eliminating the increase in Mooney viscosity, particularly during aging, of siloxane-functionalized polymers. The present invention succeeds in controlling and stabilizing Mooney viscosity by adding an effective amount of an alkyl alkoxysilane, preferably a low molecular weight alkyl trialkoxysilane, to the siloxane-terminated polymer prior to desolventization such that the alkyl alkoxysilane will react or couple with the hydrolyzable substituent such as a pendant —SiOR group of the siloxane-terminated polymers and form Si—O—Si bonds rather than having the hydrolyzable substituents of the siloxane-terminated polymers couple.

Siloxane-terminated polymers are well known in the art and have been prepared in U.S. Pat. No. 3,244,664 to Zelinski et al. and U.S. Pat. No. 4,185,042 to Verkouw, both of which are herein incorporated by reference. The process of the present invention is particularly applicable to any elastomer having a siloxane-functionalized end group having a hydrolyzable substituent which, when hydrolyzed, is subject to cross linking with other hydrolyzed groups. An exemplary hydrolyzable group is a pendant —SiOR group wherein R is an alkyl, cycloalkyl, or aromatic group capable of coupling with a like or similar pendant —SiOR group to from an Si—O—Si bond.

The polymers end capped with siloxane terminal groups that can be stabilized in accordance with the process of the present invention can be any elastomer known in the art including polybutadiene, polyisoprene, and the like, and copolymers thereof with monovinyl aromatics such as styrene, alpha methyl styrene and the like, and trienes such as myrcene. Thus, the elastomers include diene homopolymers and copolymers thereof with monovinyl aromatic polymers. Exemplary diene homopolymers are those prepared from diolefin monomers having from about 4 to about 12 carbon atoms. Exemplary vinyl aromatic polymers are those prepared from monomers having from about 8 to about 20 carbon atoms. Preferred elastomers include diene homopolymers such as polybutadiene and polyisoprene and copolymers such as styrene butadiene rubber (SBR). Polymers and copolymers can comprise from 100 to about 20 percent by weight of diene units and from 0 to about 80 percent by weight of monovinyl aromatic hydrocarbon or triene units, totaling 100 percent. The copolymers are preferably either random copolymers or block copolymers as is known in the art. Such block copolymers which include poly(styrene-butadiene-styrene) are thermoplastic elastomers. The elastomers utilized and treated in accordance with the process of the present invention display utility in a number of applications including use in the manufacture of tires.

Polymerization of the elastomers is preferably conducted in the presence of the organolithium anionic initiator catalyst composition. The organolithium initiator employed may be any of the anionic organolithium initiators known in the art to be useful in the polymerization of 1,3-diene monomers. In general, the organolithium compounds are hydrocarbyl lithium compounds of the formula $R(Li)_x$ wherein R represents hydrocarbyl groups containing from one to about 20 carbon atoms, and preferably from about 2 to about 8 carbon atoms and x is an integer from 1 to 2. Although the hydrocarbyl group is preferably an aliphatic group, the hydrocarbyl group may also be cycloaliphatic or aromatic. The aliphatic groups may be primary, secondary, or tertiary groups although the primary and secondary groups are preferred. Examples of aliphatic hydrocarbyl groups include methyl, ethyl, n-propyl, isopropyl, n-butyl, sec-butyl, t-butyl, n-amyl, sec-amyl, n-hexyl, sec-hexyl, n-heptyl, n-octyl, n-nonyl, n-dodecyl, and octa-decyl. The aliphatic groups may contain some unsaturation such as allyl, 2-butenyl, and the like. Cycloalkyl groups are exemplified by cyclohexyl, methylcyclohexyl, ethylcyclohexyl, cycloheptyl, cyclopentylmethyl, and methylcyclopentylethyl. Examples of aromatic hydrocarbyl groups include phenyl, tolyl, phenylethyl, benzyl, naphthyl, phenyl cyclohexyl, and the like.

Specific examples of organolithium compounds which are useful as anionic initiators in the polymerization of conjugated dienes in accordance with the process of the present invention include the following: n-butyl lithium, n-propyl lithium, isobutyl lithium, tertiary butyl lithium, amyl-lithium, and cyclohexyl lithium. Mixtures of different lithium initiator compounds also can be employed preferably containing one or more lithium compounds such as $R(Li)_x$. Other lithium catalysts which can be employed alone or in combination with the hydrocarbyl lithium initiators are tributyl tin lithium, lithium dialkyl amines, lithium dialkyl phosphines, lithium aklyl aryl phosphines and lithium diaryl phosphines. The preferred organolithium initiator is n-butyl lithium and "in situ" produced lithium hexamethylenimide initiator prepared by reacting hexamethyleneimine and n-butyl lithium.

The amount of initiator required to effect the desired polymerization can be varied over a wide range depending upon a number of factors such as the desired polymer molecular weight, the desired 1,2- and 1,4-content of the polydiene, and the desired physical properties for the polymer produced. In general, the amount of initiator utilized may vary from as little as 0.2 millimole of lithium per 100 grams of monomers up to about 100 millimoles of lithium per 100 grams of monomers depending upon the desired polymer molecular weight.

The polymerizations of the present invention are conducted in an inert solvent and are consequently solution polymerizations. The term "inert solvent" means that the solvent does not enter into the structure of the resulting polymer, does not adversely affect the properties of the resulting polymer, and does not adversely affect the activity of the catalyst employed. Suitable inert solvents include hydrocarbon solvents which may be contain aliphatic, aromatic or cycloaliphatic hydrocarbons such as hexane, pentane, toluene, benzene, cyclohexane and the like. Ethers such as tetrahydrofuran and tertiary amines such as triethylamine and tributylamine may also be used as solvents, but these will modify the polymerization as to styrene distribution, vinyl content and rate of reaction. The preferred solvents are aliphatic hydrocarbons and of these solvents, hexane is particularly preferred.

Polymerization conditions such as temperature, pressure and time are well known in the art for polymerizing the polymerizable monomers as described with the anionic initiator as described. For example, for illustrative purposes only, the temperature employed in the polymerization are generally not critical and may range from about −60° C. to about 150° C. Preferred polymerization temperatures may range from about 25° C. to about 130° C. for a polymerization time of a few minutes to up to 24 hours or more, and employing pressures generally sufficient to maintain polymerization admixtures substantially in the liquid phase, preferably at or near atmospheric pressure, depending on the temperature and other reaction parameters. Polymerization of any of the above-identified monomers in the presence of an organolithium initiator results in the formation of a "living polymer". The lithium proceeds to move down the growing chain as polymerization continues. The "living polymer" from the foregoing monomers, has the following general formula:

Polymer-Li wherein the polymer is any of the foregoing elastomers, diene homopolymers, diene/monvinyl aromatic random copolymers and block copolymers.

In order to promote randomization in copolymerization and to control vinyl content, one or more modifiers may optionally be added to the polymerization ingredients. Amounts range from between 0 and about 90 or more equivalents per equivalent of lithium. Compounds useful as modifiers are typically organic and include those having an oxygen or nitrogen hetero-atom and a non-bonded pair of electrons. Examples include dialkyl ethers of mono and oligo alkylene glycols; "crown" ethers; tertiary amines such as tetramethyethylene diamine (TMEDA); tetrahydrofuran (THF), THF oligomers linear and cyclic oligomeric oxolanyl alkanes and the like. Particular examples of these modifiers include potassium t-butylamylate and 2,2'-di (tetrahydrofuryl) propane. These modifiers may be found in U.S. Pat. No. 4,429,091, owned by the Assignee of record.

Polymerization is begun by charging a blend of the monomer(s) and solvent to a suitable reaction vessel, followed by the addition of the modifier(s) and the initiator solution previously described. The procedure is caried out under anhydrous, anaerobic conditions. The reactants may be heated to a temperature of from about 23° C. to about 120° C., and are typically agitated for about 0.15 to about 24 hours. After polymerization is complete, the product may be removed from the heat and terminated with a siloxane end group as is readily known in the art, although termination could also be done without removal of heat. Prior to terminating the polymerization reaction with a siloxane end group, a tin coupling agent may be added to the polymerization reaction to increase the Mooney viscosity to a desired range. Tin coupling agents such as tin tetrachloride ($SnCl_4$) are well known in the art and may be added in varying amounts, typically in amounts of 0 to about 0.9 mole equivalent s per each mole equivalent of anionic initiator depending upon the desired Mooney viscosity of the polymer.

The siloxane terminated polymers to be treated in the process of the present invention include any elastomer having a terminal siloxane end group in which the siloxane end group contains one or more hydrolyzable pendant substituents.

Exemplary siloxane terminated polymers are represented by the following structural formula:

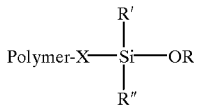

wherein X may be present or not present and represents a linking agent or a linking molecule, and wherein R is a $C_1$ to $C_{18}$ alkyl, $C_4$ to $C_8$ cycloalkyl or $C_6$ to $C_{18}$ aromatic group, and R' and R" may be the same or different and are selected from the group consisting of —OR, a $C_1$ to $C_{18}$ alkyl, $C_4$ to $C_8$ cycloalkyl or $C_6$ to $C_{18}$ aromatic group.

Optically, upon termination, the siloxane terminated polymer would then be coagulated and quenched, if necessary, dried, and/or then undergo desolventization. Quenching may be conducted, if necessary, by contacting the siloxane terminated polymer with a quenching agent for about 0.05 to about 2 hours at temperatures of from about 30° C. to about 120° C. to insure complete reaction. Suitable quenching agents include carboxylic acids such 2-ethyl hexanoic acid (EHA), acetic acid and the like. Coagulation is typically done with alcohols such as methanol or isopropanol. Alternative to, or in combination with, the step of quenching, the siloxane terminated polymer may be drum dried as is well known in the art. The use of steam or high heat to remove solvent is also well known in the art.

However, in the process of the present invention, and prior to quenching, drying or removing the solvent, the present invention adds a viscosity stabilizing agent, namely an alkyl alkoxysilane having the structural formula:

wherein each $R^1$ is selected from the group consisting of $C_1$ to $C_{20}$ alkyl, $C_4$ to $C_{10}$ cycloalkyl, or $C_5$ to $C_{20}$ aromatic groups, wherein each $R^2$ may be the same as or different from $R^1$ or other $R^2$, if any, and is selected from the group consisting of $C_1$ to $C_{20}$ alkyl, $C_4$ to $C_{10}$ cycloalkyl, or $C_5$ to $C_{20}$ aromatic groups, and wherein n is an integer from 1 to 3. Particularly preferred as viscosity stabilizing agents are those low molecular weight alkyl alkoxysilanes selected from the group consisting of alkyl trialkoxy silanes, i.e., those alkyl alkoxysilanes where n=1 in the structural formula set forth hereinabove. Of the alkyl trialkoxy silanes, most preferred is octyl triethoxy silane (OTES).

The viscosity stabilizing agents of the present invention can be employed in varying amounts and the amount employed is particularly dependent upon the type of alkyl alkoxysilane employed since reaction with the siloxane terminated polymers is dependent upon the molar ratio of the added alkyl alkoxysilane to the siloxane terminated polymer. For example, where a trialkyl alkoxysilane (n=3) is used, a significant amount of the agent will be necessary to provide a ratio which will supply a sufficiently high molar ratio of stabilizing agent to siloxane-terminated polymer. On the other hand, lesser amounts of alkyl trialkoxysilane can be used because there are a greater number of —SiOR groups available for reaction with the siloxane end groups of the polymer. Nevertheless, for the alkyl trialkoxysilanes, preferred amounts may range from about 1 to about 50 mole equivalents per mole equivalent of anionic initiator, and more preferrably, a range of from about 1 to about 20 mole equivalents per mole equivalent of anionic initiator is desired.

It will be appreciated that, in contrast to U.S. Pat. No. 5,659,056, the viscosity stabilizing agents of the present invention do react with the siloxane terminal end groups of the polymer. However, because the Si—O—Si bonds being produced are between the siloxane terminated polymer and the alkyl alkoxysilane additive, and not between the siloxane terminated polymers themselves, there is no significant increase in Mooney viscosity.

For a proper understanding of the invention, the following reaction schemes show first the hydrolysis reaction which occurs. This reaction (shown as Scheme I) is well known in the art and typically leads to the coupling of siloxane-terminated polymers through the subsequent formation of Si—O—Si bonds.

Scheme I

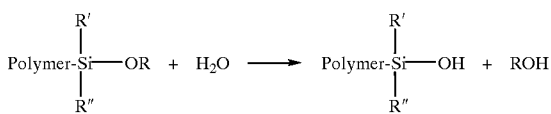

However, because of the abundance of —SiOR groups available from the addition of the viscosity stabilizing agent, namely the alkyl alkoxysilanes as described above, any Si—O—Si bonds formed are between the hydrolyzable siloxane terminated polymer and the stabilizing agent, not between the polymers themselves. Thus, as shown in Scheme II, a new moisture stabilized polymer is produced.

Scheme II

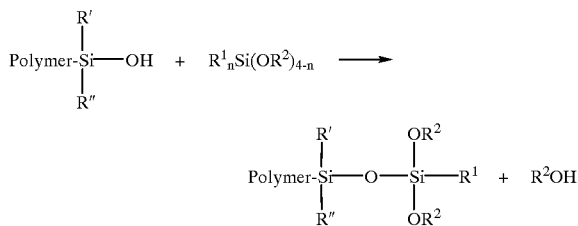

It will be appreciated that, having undergone the hydrolysis reaction set forth above, this new moisture stabilized polymer is no longer susceptible to an increase in Mooney viscosity due to coupling of the hydrolyzable siloxane end groups on the polymers and that, upon aging, there will be no increase in Mooney viscosity. The formation of Si—O—Si bonds takes place between the polymer and the additive due to the significant higher ratios of —SiOR groups available from the stabilizing agent than would be present from the polymer. In a preferred embodiment, the molar ratio of hydrolyzable —SiOR groups available from the alkyl alkoxysilane additive to hydrolyzable —SiOR groups available from the polymer should be at least 1:1, preferably 10:1 and most preferably, at least 20:1 or more. Also, the viscosity stabilizing agent should preferably have a low molecular weight in order to further ensure that it will react with the polymer.

In addition to the viscosity stabilizing agent, an antioxidant such as 2,6-di-t-butyl-4-methylphenol or other butylated hydoxy toluene (BHT) may be added in solvent (hexane) solution as is well known in the art. The antioxidant insures that Mooney viscosity stability is not due to oxidative coupling.

In order to demonstrate practice of the present invention, alkoxysilane-terminated styrene-butadiene rubber (SBR) was prepared under anhydrous and anaerobic conditions in a five-gallon, jacketed, stainless steel reactor fit with a stirrer. Specifically, 717 g of hexane, 2839 g of 26.9% by weight styrene in hexane, and 7747 g of 28.1% by weight butadiene in hexane were added to the reactor. Then, "in situ" lithium hexamethyleneimide initiator was prepared by adding 16.27 ml of 1.3 M potassium t-butylamylate in hexane, 7.96 ml of 3.54 M hexamethyleneimine in cyclohexane, 4.93 ml of 0.5 M 2,2''-di(tetrahydrofuryl) propane in hexane, and 23.5 ml of 1.5 M n-butyllithium in hexane to the reactor and raising the jacket temperature to 23° C. After 3 hours, 12.34 ml of 0.25 M $SnCl_4$ in hexane was added to the reactor. Five minutes later, 14.16 ml of 1.12 M tetraethoxysilane was added to the reactor, thereby terminating the living polymerization reaction. The cement was then transferred to dry, $N_2$ purged bottles. To each bottle was then added 5 ml of 0.5 M 2,6-di-t-butyl-4-methylphenol and a variable amount of octyltriethoxy silane as set forth in Table I hereinbelow. The polymer was then drum dried, removing the solvent.

The resultant polymer samples were then recovered and aged at 95° C. and 90% humidity for 5 days. Mooney viscosity (100% at 100° C.) was measured at 1, 4, and 5 days. The results of the Mooney viscosity tests are shown in Table I.

TABLE I

| Accelerated Polymer Aging Study* | | | |
|---|---|---|---|
| Molar Ratio of OTES/BuLi | ML1 + 4 1 day | ML1 + 4 4 days | ML1 + 4 5 days |
| 0 | 76.3 | 76.6 | 80 |
| 1 | 65 | 68.9 | 67.5 |
| 5 | 40.7 | 42 | 40.8 |
| 10 | 38.3 | Not Measured | 38.3 |
| 20 | 32.8 | 35.9 | 35 |

*Initial ML1 + 4 was 46.5

Upon review of the results of the tests, it can be seen that Mooney viscosity does not increase upon aging of the samples. In fact, Mooney viscosity actually decreased upon aging. While not being bound by theory, it is believed that this decrease in viscosity was due to a plastisizer effect. However, it is clear that the stabilization of Mooney viscosity was due to the change in the polymer hydrolysis reaction, not due to a plastisizer effect.

In review of the results of the tests, it is clear that the higher the molar ratio of the hydrolyzable —SiOR groups present from the stabilizing agent to hydrolyzable —SiOR groups present from the siloxane-terminated polymer, the lower the Mooney viscosity of the resultant polymer.

Thus it should be evident that the methods of the present invention are highly effective in controlling any rise in Mooney viscosity upon aging of a siloxane-modified polymer. The invention is particularly suited for alkoxysilane terminated polymers, but is not necessarily limited thereto. The moisture stabilized polymers and method of the present invention can be used separately with other equipment, methods and the like, to produce various elastomeric materials or compounds suitable for use in the production of various articles including pneumatic tires and the like.

Based upon the foregoing disclosure, it should now be apparent that the use of the viscosity stabilizing agent in the process described herein will carry out the objects set forth hereinabove. It is, therefore, to be understood that any variations evident fall within the scope of the claimed invention and thus, the selection of specific component elements can be determined without departing from the spirit of the invention herein disclosed and described. In particular, the viscosity stabilizing agents according to the present invention are not necessarily limited to alkyl trialkoxysilanes, but rather to any suitable, preferably low molecular weight alkyl alkoxysilane capable of reacting with the siloxane-functionalized polymer. Moreover, as noted hereinabove, other polymer can be substituted for the styrene-butadiene rubber exemplified. Thus, the scope of the invention shall include all modifications and variations that may fall within the scope of the attached claims.

What is claimed is:

1. A method for stabilizing the Mooney viscosity of a siloxane-terminated polymer having at least one hydrolyzable substituent on the siloxane end group by adding, after the polymerization but still in the presence of an inert solvent, a viscosity stabilizing effective amount of a viscosity stabilizing agent selected from the group consisting of alkyl alkoxysilanes of the structural formula $$R^1_n Si(OR^2)_{4-n}$$

wherein $R^1$ is selected from the group consisting of $C_1$ to $C_{20}$ alkyl, $C_4$ to $C_{10}$ cycloalkyl, or $C_5$ to $C_{20}$ aromatic groups, wherein $R^2$ may be the same as or different from $R^1$ or other $R^2$, if any, and is selected from the group consisting of $C_1$ to $C_{20}$ alkyl, $C_4$ to $C_{10}$ cycloalkyl, or $C_5$ to $C_{20}$ aromatic groups, and wherein n is an integer from 1 to 3, prior to contacting the polymer with water.

2. The method of claim 1 wherein said viscosity stabilizing agent is selected from the group consisting of alkyl trialkoxysilanes.

3. The method of claim 2 wherein said viscosity stabilizing agent is octyl triethoxy silane.

4. The method of claim 1 wherein said viscosity stabilizing effective amount of said viscosity stabilizing agent is from about 1 to about 50 mole equivalents of the viscosity stabilizing agent per each mole equivalent of anionic initiator used in the polymerization of the siloxane terminated polymer.

5. The method of claim 4 wherein said viscosity stabilizing effective amount of said viscosity stabilizing agent is from about 1 to about 20 mole equivalents of the viscosity stabilizing agent per each mole equivalent of anionic initiator used in the polymerization of the siloxane terminated polymer.

6. The method of claim 1 wherein the step of contacting the siloxane terminated polymer with water comprises contacting the siloxane terminated polymer with moisture during storage.

7. The method of claim 1 wherein the viscosity stabilizing agent is substantially soluble in the solvent used in the polymerization of the siloxane terminated polymer.

8. The method of claim 1, wherein the molar ratio of the viscosity stabilizing agent to the siloxane-terminated polymer is at least 1:1.

9. The method of claim 8, wherein the molar ratio of the viscosity stabilizing agent to the siloxane-terminated polymer is at least 10:1.

10. The method of claim 9, wherein the molar ratio of the viscosity stabilizing agent to the siloxane-terminated polymer is at least 20:1.

11. A moisture stabilized polymer comprising the hydrolysis reaction product of a siloxane terminated polymer reacted with an alkyl alkoxysilane having the structural formula:

$$R^1_n Si(OR^2)_{4-n}$$

wherein $R^1$ is selected from the group consisting of $C_1$ to $C_{20}$ alkyl, $C_4$ to $C_{10}$ cycloalkyl, or $C_5$ to $C_{20}$ aromatic groups, wherein $R^2$ may be the same as or different from $R^1$ and is selected from the group consisting of $C_1$ to $C_{20}$ alkyl, $C_4$ to $C_{10}$ cycloalkyl, or $C_5$ to $C_{20}$ aromatic groups, and wherein n is an integer from 1 to 3.

12. A pneumatic tire comprising an elastomeric compound containing the moisture stabilized polymer of claim 11.

* * * * *